US007957849B2

(12) United States Patent
Reichart et al.

(10) Patent No.: US 7,957,849 B2

(45) Date of Patent: Jun. 7, 2011

(54) METHOD OF UPDATING ELECTRONIC OPERATING INSTRUCTIONS OF A VEHICLE AND AN OPERATING INSTRUCTIONS UPDATING SYSTEM

(75) Inventors: Guenter Reichart, Aschheim (DE); Andreas Heider, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 372 days.

(21) Appl. No.: 12/184,826

(22) Filed: Aug. 1, 2008

(65) Prior Publication Data

US 2009/0037701 A1 Feb. 5, 2009

Related U.S. Application Data

(63) Continuation of application No. PCT/EP2007/000524, filed on Jan. 23, 2007.

(30) Foreign Application Priority Data

Feb. 4, 2006 (DE) ........................ 10 2006 005 135

(51) Int. Cl.
*B60R 16/02* (2006.01)
*G06F 13/00* (2006.01)

(52) U.S. Cl. ............................... 701/1; 701/33; 717/172

(58) Field of Classification Search ........................ None
See application file for complete search history.

(56) References Cited

U.S. PATENT DOCUMENTS

| | | | | |
|---|---|---|---|---|
| 5,951,620 | A * | 9/1999 | Ahrens et al. | 701/200 |
| 6,438,468 | B1 * | 8/2002 | Muxlow et al. | 701/3 |
| 6,556,904 | B1 | 4/2003 | Larson et al. | |
| 6,859,699 | B2 | 2/2005 | Carroll et al. | |
| 7,693,612 | B2 * | 4/2010 | Bauchot et al. | 701/1 |
| 2004/0255290 | A1 * | 12/2004 | Bates et al. | 717/174 |
| 2005/0097541 | A1 * | 5/2005 | Holland | 717/168 |
| 2005/0216903 | A1 * | 9/2005 | Schaefer | 717/168 |
| 2005/0256614 | A1 * | 11/2005 | Habermas | 701/1 |
| 2005/0262498 | A1 * | 11/2005 | Ferguson et al. | 717/172 |

FOREIGN PATENT DOCUMENTS

| | | | |
|---|---|---|---|
| DE | 199 14 765 | A1 | 10/2000 |
| DE | 199 26 206 | A1 | 1/2001 |
| DE | 100 52 014 | A1 | 5/2001 |
| DE | 199 59 755 | A1 | 6/2001 |

(Continued)

OTHER PUBLICATIONS

German Search Report dated Mar. 4, 2008 including English translation of the relevant portion (Nine (9) pages).

*Primary Examiner* — Michael J. Zanelli

(74) *Attorney, Agent, or Firm* — Crowell & Moring LLP

(57) ABSTRACT

A method and system for updating electronic operating instructions of a vehicle is provided. Local operating instruction data objects are stored in a local storage device arranged in the vehicle so that they can be used by the driver. Corresponding current operating instruction data objects are stored in an external storage device. One data object category, respectively, is assigned to the operating instruction data objects. For updating, a current operating instruction data object is transmitted from the external storage device to the local storage device in order to modify the corresponding local operating instruction data object in the local storage device The frequency of the updating of a local operating instruction data object depends on the data object category assigned to the data object.

9 Claims, 1 Drawing Sheet

FOREIGN PATENT DOCUMENTS

| | | | |
|---|---|---|---|
| DE | 100 06 351 | A1 | 8/2001 |
| DE | 100 35 181 | C1 | 12/2001 |
| DE | 10 2005 037 567 | A1 | 5/2006 |
| EP | 0 911 607 | A2 | 4/1999 |
| EP | 1 288 617 | A2 | 3/2003 |
| WO | WO 01/27704 | A1 | 4/2001 |
| WO | WO 02/41172 | A2 | 5/2002 |

* cited by examiner

METHOD OF UPDATING ELECTRONIC OPERATING INSTRUCTIONS OF A VEHICLE AND AN OPERATING INSTRUCTIONS UPDATING SYSTEM

CROSS-REFERENCE TO RELATED APPLICATIONS

This application is a continuation of PCT Application No. PCT/EP2007/000524 filed on Jan. 23, 2007, which claims priority to German Application No. 10 2006 005 135.1 filed Feb. 4, 2006, the disclosures of which are incorporated by reference herein.

BACKGROUND AND SUMMARY OF THE INVENTION

The invention relates to a method of updating electronic operating instructions of a vehicle and to an operating instructions updating system.

In recent years, the continued rapid technological development in the field of vehicle engineering has focused mainly on the branch of vehicle electronics. Particularly in the field of luxury vehicles, this is accompanied by a constantly growing variety of functions. This multiplicity of functions always requires comprehensive operating instructions for a driver. Furthermore, because of electronic or software-related improvements in the course of a vehicle model cycle, there is a high updating demand with respect to these operating instructions.

Up to now, it has been possible to inform the driver or user of a vehicle with respect to the basic functions of a new vehicle and the components installed therein by means of operating instructions (manufacturer's instructions) printed on paper. In the meantime, as a result of the above-mentioned amount of information and the above-mentioned constant demand for information updating, such conventional operating instructions can no longer be efficiently utilized by the user and offered economically with the desired information quality by the manufacturer.

It is, therefore, an object of the invention to provide a technical teaching by which up-to-date operating instructions can be efficiently made available to a vehicle user.

This, and other, objects are achieved according to the invention. Advantageous further developments of the invention are also described herein.

According to the invention, for the purpose of an updating after a transmission of corresponding up-to-date operating instruction data objects from an external storage device to a vehicle, operating instruction data objects stored locally in the vehicle are modified, particularly updated, changed, replaced or amended. The frequency of the updating of an operating instruction data object depends on a data object category assigned to this object.

Depending on the embodiment, a separate data object category, such as a description, may be assigned to each operating instruction data object, or the same data object category may be assigned to several different operating instruction data objects.

By way of the invention, it is achieved that operating instruction data objects can be updated automatically, preferably electronically, particularly while including a mobile communication connection, the frequency of updating operations being based on a data object category assigned to the operating instruction data object.

Thus, automatically those operating instruction data objects, which describe, for example, software-related components of the vehicle, or which describe, for example, service addresses which, as experience shows, are changed more frequently, can be updated more frequently. In contrast, operating instruction data objects which describe images, logos or icons are preferably rarely updated.

As an alternative or in addition, operating instruction data objects, which describe, for example, optional equipment that is installed in the vehicle may be updated more frequently or always. In contrast, for example, operating instruction data objects, which describe optional equipment that is not installed in the vehicle, are rarely updated, not at all updated, or are even deleted from the local storage device of the vehicle.

The operating instruction data objects are stored locally in the vehicle. For example, they may be stored in a semiconductor memory or a hard disk drive, which can also be constructed to be removable from the vehicle, and which, for the purpose of updating, can be connected, for example, by way of a home PC to the Internet.

In order to adapt the electronic operating instructions to the vehicle user's requirements, it is provided according to an advantageous further development of the invention that a utilization factor, a utilization type, or a utilization quantity of the operating instruction data objects and/or of the corresponding data object category is automatically determined in the vehicle. The frequency of the updating of an operating instruction data object is a function of the utilization factor, the utilization type, or the utilization quantity of the operating instruction data object and/or the data object category assigned to this object.

Preferably one current status element, such as a version number, a version date or a vehicle type, respectively, is assigned to the operating instruction data objects, and an updating is a function of the current status element that is assigned to the local operating instruction date object, and/or is a function of the current status element that is assigned to the current operating instruction data object.

As a result, updates can, for example, always be carried out when the difference between the current status element of the current operating instruction data object and the current status element of the local operating instruction data object exceeds a predetermined threshold value.

The above-mentioned object is also achieved by an operating instruction updating system having a local storage device arranged in a vehicle for the storage of local operating instruction data objects, which are usable for the driver and can, for example, be displayed to the driver. The system also has an external storage device arranged outside the vehicle for storing current operating instruction data objects, which correspond to the local operating instruction data objects. In addition, the system has a transmitting device for transmitting current operating instruction data objects from the external storage device to the local storage device in order to modify the corresponding local operating instruction data objects for updating purposes in the local storage device corresponding to the current operating instruction data objects. A control device is arranged such that the frequency of the updating of an operating instruction data object is a function of the data object category assigned to the latter.

Other objects, advantages and novel features of the present invention will become apparent from the following detailed description when considered in conjunction with the accompanying drawing.

DETAILED DESCRIPTION OF THE DRAWING

Figure 1:
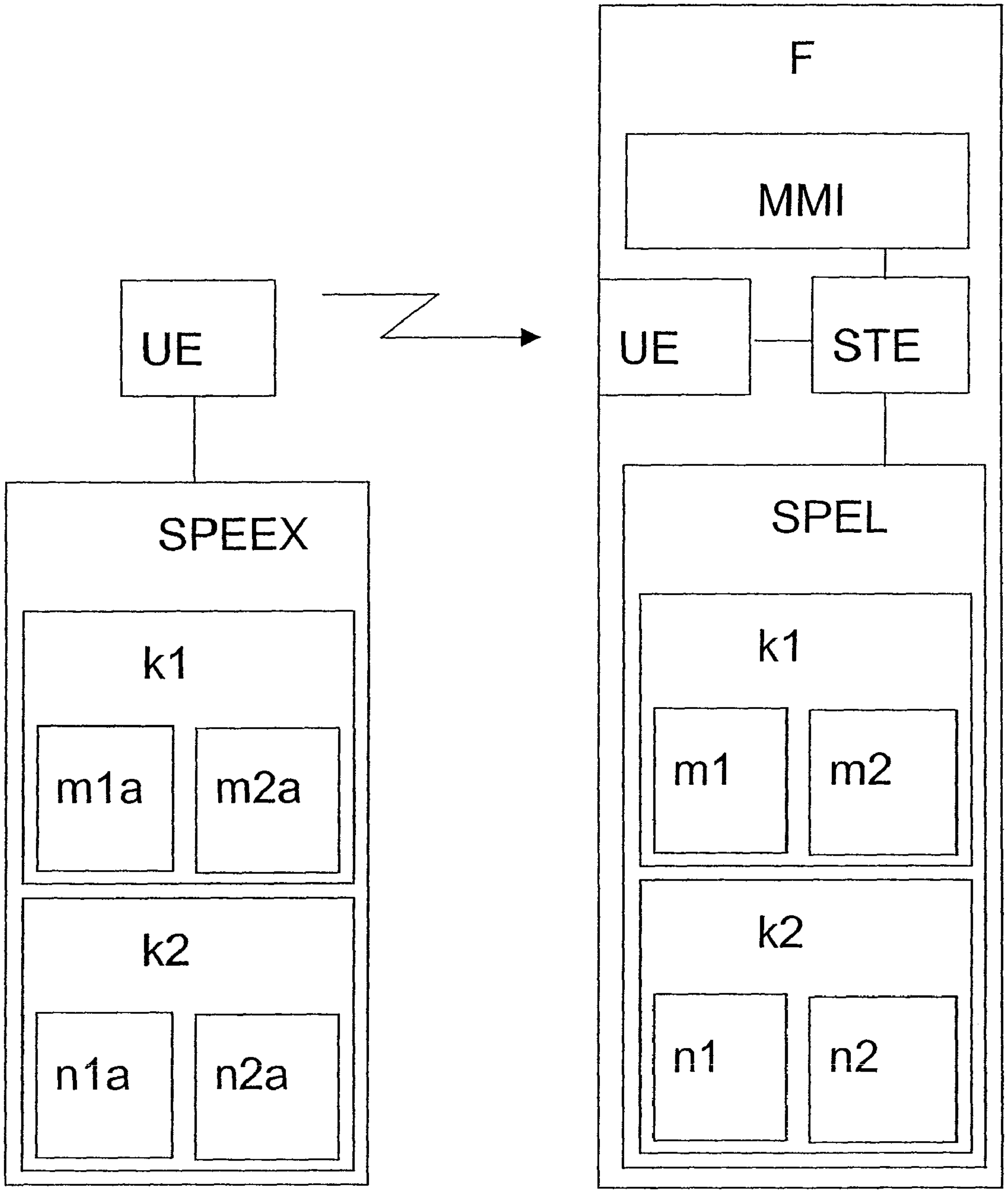
FIG. 1 is a schematic representation of an operating instruction updating system according to the invention.

FIG. 1 illustrates a vehicle F, such as a car, having a user interface MMI, which has a display for the section-by-section indication of electronic operating instructions or operating instruction data objects, and an input device, such as different keys, for the selection of, and for the scrolling through of, electronic operating instruction sections or operating instruction data objects.

Various local operating instruction data objects, m1, m2, n1, n2 assigned to different data object categories k1, k2 are stored in a local electronic storage device SPEL located in the vehicle, which operating instruction data objects m1, m2, n1, n2 represent, for example, the different sections of the electronic operating instructions which can be graphically shown on the display. In this case, an operating instruction data object may be implemented as a digitally coded computer file.

Different current operating instruction data objects m1*a*, m2*a*, n1*a*, n2*a* also assigned to the above-mentioned various data object categories k1, k2 are stored in an external electronic storage device SPEEX, which current operating instruction data objects m1*a*, m2*a*, n1*a*, n2*a* correspond to the local operating instruction data objects m1, m2, n1, n2 but are constantly kept current by the vehicle manufacturer.

By way of a transmission system UE, which includes a mobile-communications-based transmitting and/or receiving device, for example, on the vehicle side as well as on the side of the external storage device SPEEX, operating instruction data objects m1, m2, n1, n2 can be updated in the local storage device SPEL in that corresponding current operating instruction data objects m1*a*, m2*a*, n1*a*, n2*a* are transmitted by the external storage device SPEEX to the local storage device SPEL.

The control device STE may be constructed as a program-controlled processor device or as an application-specific integrated circuit (ASIC) and is correspondingly set up for controlling essential components of the operating instruction updating system and for controlling or implementing the following process steps.

The control device STE can be implemented in a distributed or central manner inside the vehicle and/or outside the vehicle, for example, assigned to the external storage device SPEEX at a vehicle manufacturer or service provider.

As a result of a corresponding determination of the sections of the electronic operating instructions or operating instruction data objects queried by the vehicle user by way of the user interface MMI, one utilization factor respectively, which may be determined by the query frequency and/or the query duration of a corresponding operating instruction data object m1, m2, n1, n2 or of the data object categories k1, k2 assigned to the latter, is assigned to the operating instruction data objects m1, m2, n1, n2 stored in the local storage device SPEL or to the data object categories k1, k2 assigned to the latter, and is stored.

In addition, a generation date, which relates to the operating instruction data object, is assigned as the current status element to each operating instruction data object m1, m2, n1, n2, m1*a*, m2*a*, n1*a*, n2*a*.

At certain times or in certain situations, a portion of the local operating instruction data objects m1, m2, n1, n2 is, in each case, selectively updated based on corresponding current operating instruction data objects m1*a*, m2*a*, n1*a*, n2*a*.

For example, updating can automatically always take place when particularly favorable or broadband transmission resources are available to the transmission system UE. This may occur for example, when the vehicle has access to the external storage device SPEEX or can connect to the latter in a gas station or other store by way of a W-LAN access point and/or the Internet.

In this case, the selection of the operating instruction data objects m1, m2, n1, n2 to be updated and, therefore, the selection of the current operating instruction data objects m1*a*, m2*a*, n1*a*, n2*a* to be transmitted, is based on predefined rules. The predefined rules, while including the current status elements and the utilization factors of the operating instruction data objects m1, m2, n1, n2 and/or of the data object categories k1, k2, preferably or exclusively define those operating instruction data objects m1, m2, n1, n2 and/or data object categories k1, k2, which are frequently queried by the vehicle user and/or which, relative to the current status element of the corresponding current operating instruction data object m1*a*, m2*a*, n1*a*, n2*a*, have not been updated for some time.

For example, at the above-mentioned times or in the above-mentioned situations, operating instruction data objects m1, m2, n1, n2, which were more frequently indicated to the drivers as y-mail, will always be updated when a more current corresponding operating instruction data object m1*a*, m2*a*, n1*a*, n2*a* is present in the external storage device SPEEX.

For a corresponding implementation, before the actual transmission of the current operating instruction data objects m1*a*, m21, n1*a*, n2*a*, information concerning the utilization factors and the current status elements of the operating instruction data objects m1, m2, n1, n2 is transmitted by way of the transmission system UE from the local storage device SPEL or from the control device STE to the external storage device SPEEX or to a control device (not shown) assigned to this storage device SPEEX.

For example, operating instruction data objects m1, m2, n1, n2, which were displayed to the driver more frequently than x times but less than y+1 times, are always updated when a more updated corresponding operating instruction data object m1*a*, m2*a*, n1*a*, n2*a* is present in the external storage device SPEEX, and at least a predefined time period of, for example, two months exists between the generation date of the local operating instruction data object and the generation date of the corresponding external operating instruction data object. It is assumed that x and y are predefined natural numbers in this example.

Operating instruction data objects m1, m2, n1, n2, which were displayed to the driver fewer than x+1 times, are, for example, never updated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of updating electronic operating instructions of a vehicle, the method comprising the acts of:

storing local operating instruction data objects in a local storage device arranged in the vehicle for use by a user;

storing corresponding current operating instruction data objects in an external storage device;

assigning one data object category, respectively, to the operating instruction data objects;

updating a current operating instruction data object, in accordance with an update frequency, from the external storage device to the local storage device in order to modify the corresponding local operating instruction data object in the local storage device; and wherein said update frequency of the local operating instruction data object depends on the data object category assigned to the data object.

2. The method according to claim 1, further comprising the acts of:

automatically determining in the vehicle a utilization factor of the operating instruction data objects and of the corresponding data object category; and wherein the update frequency of the operating instruction data object depends on the utilization factor of the data object.

3. The method according to claim 2, wherein the utilization factor for the data object corresponds to a utilization quantity for at least one of the data object and the data object category assigned to the data object.

4. The method according to claim 1, wherein one current status element respectively is assigned to the operating instruction data objects; and wherein updating is a function of at least one of: (a) the current status element assigned to the local operating instruction data object, and (b) the current status element that is assigned to the current operating instruction data object.

5. An operating instruction updating system, comprising:

a local storage device arranged in a vehicle for storing local operating instruction data objects usable by a vehicle user;

an external storage device arranged outside the vehicle for storing current operating instruction data objects, which correspond to the local operating instruction objects, one data object category respectively being assigned to the operating instruction data objects;

a transmission system for transmitting current operating instruction data objects from the external storage device to the local storage device in order to update, in accordance with an update frequency, the corresponding local operating instruction data objects in the local storage device; and a control device of the transmission system, which is arranged such that the update frequency of an operating instruction data object is a function of the data object category assigned to the data object.

6. The operating instruction updating system according to claim 5, wherein the update frequency of the operating instruction data object further depends on a utilization factor for the data object, and wherein the utilization factor for the data object corresponds to a utilization quantity for at least one of the data object and the data object category assigned to the data object.

7. A method of updating electronic operating instructions of a vehicle having stored therein local operating instruction data objects, the method comprising the acts of:

assigning one data object category respectively to the operating instruction data objects;

updating, at an update frequency, one or more of the local operating instruction data objects with a current operating instruction data object received from outside the vehicle, wherein the update frequency is dependent upon the assigned data object category.

8. The method according to claim 7, wherein the electronic operating instructions provide an electronic user's manual for the vehicle.

9. The method according to claim 7, wherein the update frequency of the operating instruction data object further depends on a utilization factor for the data object, and wherein the utilization factor for the data object corresponds to a utilization quantity for at least one of the data object and the data object category assigned to the data object.

* * * * *